United States Patent [19]

Ogilvie

[11] 3,774,108

[45] Nov. 20, 1973

[54] ELECTROSTATIC POTENTIAL DETECTOR

[75] Inventor: Allan Rhodes Ogilvie, Hillsborough, Calif.

[73] Assignee: FRL Incorporated, Belmont, Calif.

[22] Filed: Dec. 13, 1971

[21] Appl. No.: 207,265

[52] U.S. Cl............... 324/72, 324/32, 324/72.5
[51] Int. Cl............................................ G01r 29/12
[58] Field of Search..................... 324/32, 72, 72.5, 324/109

[56] References Cited
UNITED STATES PATENTS
2,993,167  7/1961  Smith............................. 324/72.5 X
3,370,225  2/1968  Winder........................... 324/109 X
2,531,609  11/1950  Bulgin................................. 324/72
3,056,926  10/1962  Borck............................. 324/72.5 X FOREIGN PATENTS OR APPLICATIONS
511,434  8/1939  Great Britain....................... 324/32

Primary Examiner—Rudolph V. Rolinec
Attorney—Paul D. Flehr et al.

[57] ABSTRACT

Instrument for detecting presence of energized conductors and determining whether conductors are energized by detecting electrostatic fields produced thereby. An attenuator assembly provides means for adjusting the sensitivity of the instrument, and an on/off switch is arranged in such manner that the instrument is in its most sensitive condition when first turned on.

5 Claims, 4 Drawing Figures

PATENTED NOV 20 1973   3,774,108
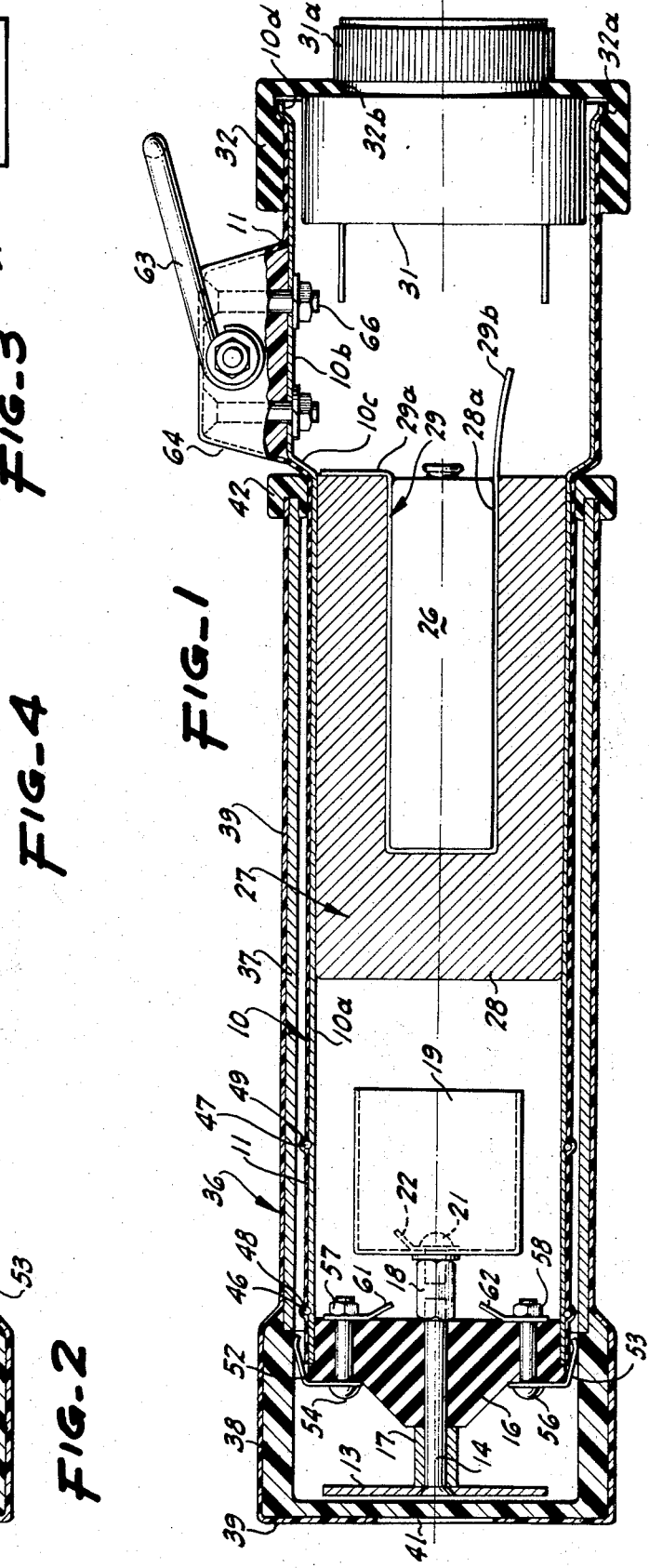
FIG.-1
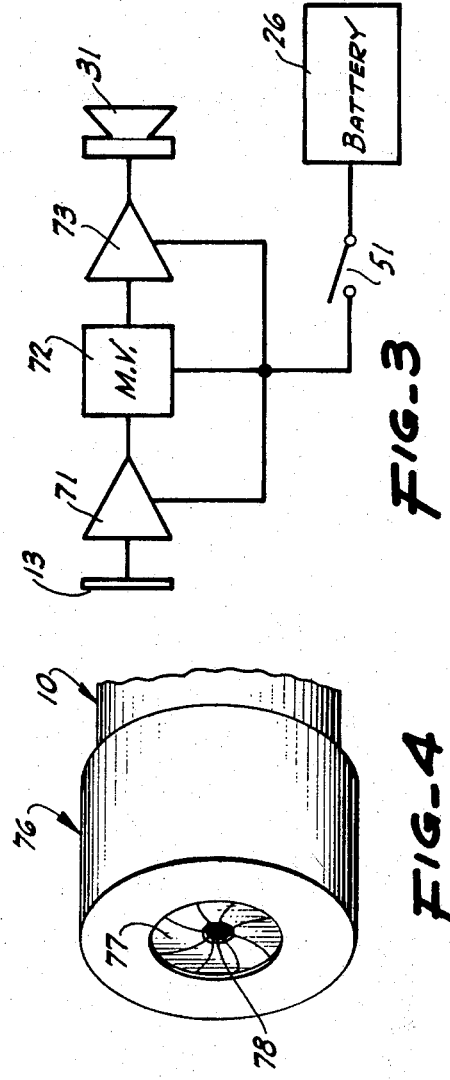
FIG.-2
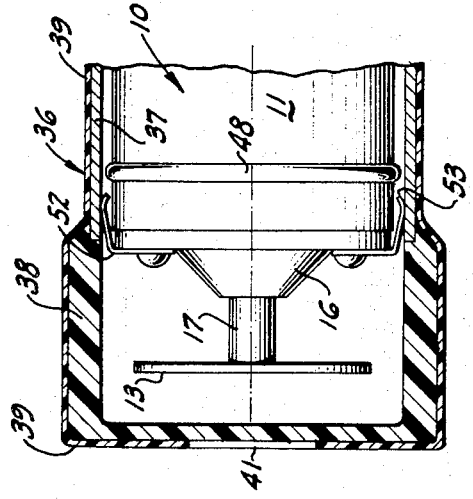
FIG.-3
FIG.-4

ELECTROSTATIC POTENTIAL DETECTOR

BACKGROUND OF THE INVENTION

This invention pertains generally to electrometers and more particularly to a small, hand-held device for detecting the presence of an electrostatic potential.

It is desirable for workmen and others to be able to detect the presence of energized electrical conductors and to determine whether conductors are energized without touching them. An electric current flowing in a conductor produces a magnetic field which can be detected with conventional magnetically responsive instruments. When no current flows, a conductor can still be energized with a hazardous potential or voltage which produces an electrostatic field, but no magnetic field.

Heretofore, there have been attempts to detect the presence of an electrostatic potential by placing a disk of electrically conductive material in the field produced by the potential and monitoring the resulting electrostatic charge accumulation on the disk. Such attempts have not been entirely successful, particularly where the levels of the potentials to be detected vary widely. For example, household wiring typically carries potentials on the order of 100 volts, whereas high voltage power transmission lines may carry potentials on the order of tens or hundreds of thousands of volts.

SUMMARY AND OBJECTS OF THE INVENTION

The present invention provides an electrostatic electric potential detector which is suitable for detecting electrostatic fields produced by a wide range of potentials. It includes an electrostatic sensing element and an alarm which actuates when the sensing element is exposed to an electrostatic field of predetermined intensity. An attenuator provides means for adjusting the sensitivity of the instrument by varying the effective strength of the electrostatic field to which the sensing element is exposed. An on/off switch is operably connected to the attenuator in such manner that the instrument is in its most sensitive condition when first turned on. Assurance that the instrument is operating properly is given by an intermittent audible tone in the absence of an electrostatic field. When a field of the predetermined intensity is detected, the intermittent tone is converted to a continuous or steady tone. The device is a compact and rugged unit which is readily carried and operated by workmen and others.

It is in general an object of the present invention to provide a new and improved electrostatic potential detector.

Another object of the invention is to provide an electrostatic potential detector of the above character which is suitable for use over a wide range of potentials.

Another object of the invention is to provide an electrostatic potential detector of the above character which is failsafe in operation.

Another object of the invention is to provide an electrostatic potential detector of the above character which is self-contained, readily portable and easily used.

Additional objects and features of the invention will be apparent from the following description in which the preferred embodiments are set forth in detail in conjunction with the accompanying drawing.

BRIEF DESCRIPTION OF THE DRAWING

FIG. 1 is an elevational view, partially sectioned, of one embodiment of an electrostatic potential detector incorporating the present invention.

FIG. 2 is a fragmentary view, illustrating the operation of the attenuator sleeve and on/off switch of the embodiment shown in FIG. 1.

FIG. 3 is a block diagram of one embodiment of a circuit suitable for use in the embodiment shown in FIG. 1.

FIG. 4 is a fragmentary isometric view of another embodiment of an electrostatic potential detector generally similar to the embodiment shown in FIG. 1, but having an adjustable iris assembly for adjusting the sensitivity of the instrument.

DESCRIPTION OF THE PREFERRED EMBODIMENTS

The electrostatic potential detector includes an axially elongated tubular housing or body 10 which has a barrel portion 10a and a base portion 10b. Both the barrel portion and the base portion are circular in cross section, and they are joined together by a conical shoulder 10c. An annular lip 10d is formed at the outer end of the base portion. In the preferred embodiments, the housing 10 is fabricated of aluminum, and it formed as a unitary structure by a suitable process such as spinning. The outer surface of the housing is provided with an electrically insulative covering 11 of a material such as polyolefin. In the preferred embodiment, this material is shrink-fitted to the housing to provide a smooth contour and a tight bond.

An electrostatic sensing element 13 is provided at the outer end of the barrel portion 10a of the housing. This element comprises a disk of electrically conductive material disposed coaxially of the housing. It is mounted to the housing by means of an axially extending screw 14 and a plug 16. The plug is fabricated of insulative material, and it is secured in the end of the housing by means of screws, not shown. A spacer 17 is provided between the disk and plug, and an elongated nut 18 engages the threads at the inner end of the screw 14.

Means is provided for mounting the circuitry of FIG. 3 within the housing 10. This means includes a small cup-shaped housing 19 which is secured to the elongated nut 18 by means of a screw 21. A terminal 22 mounted under the head of this screw provides electrical contact with the disk 13.

A battery 26 is also carried within the barrel portion of the housing 10. The battery is mounted in a battery holder 27 which comprises a cylindrical block 28 having a recess 28a formed in one end thereof. The contour of this recess corresponds generally to the outer contour of the battery which is disposed therein. A U-shaped strap 29 extends between the battery and the bottom and side walls of the recess. The strap is fabricated of a flexible and somewhat resilient material, and it retains the battery in the recess by friction. One end 29a of the strap is secured to the block 28, and the other end 29b is free and can be pulled to dislodge the battery from the recess. The block is secured to the housing 10 by means of screws, not shown.

An alarm device or output transducer 31 is provided at the outer end of the base portion of the housing 10. This device produces an audible tone when energized, and a suitable device is marketed by Mallory under the trademark "SONALERT". An end cap 32 is removably mounted on the outer end of the base portion. This cap is fabricated of an insulative material such as molded rubber, and it is formed to include an annular recess 32a which engages the lip 10d. The output transducer 31 is mounted in an opening 32b in the end cap 32 and retained in place by a cap or nut 31a.

An adjustable attenuator assembly 36 is mounted over the barrel portion of the housing 10. This assembly includes a tubular sleeve 37 which is disposed coaxially of the housing 10. In the preferred embodiment, this sleeve is fabricated of an electrically conductive material such as aluminum. An end cap 38 is provided at the outer end of the sleeve 37, and this cap is fabricated of an electrically insulative material such as an acetal thermoplastic. A suitable material is available from DuPont under the trademark "DELRIN". The end cap is bonded to the sleeve by suitable means, such as cementing, and an insulative covering 39 is provided on the outer surfaces of the cap and sleeve. In the preferred embodiment, this covering is fabricated of polyolefin, and it is shrink-fitted to the cap and sleeve. A circular window 41 is formed in the insulative covering adjacent the sensing disk 13, and an annular retaining ring 42 is provided at the inner end of the attenuator sleeve. In the preferred embodiment, the retaining ring is fabricated of molded rubber, and it is bonded to the sleeve and insulative coating by cementing.

The attenuator sleeve is slidably mounted on the housing 10 and movable between extended and retracted positions. A pair of O-rings 46, 47 are mounted in circular grooves formed in the outer surface of the barrel portion 10a of the housing beneath the insulative covering 11 and form ridges 48, 49 which serve as guides for the attenuator sleeve. The retaining ring 42 serves as a guide at the inner end of the attenuator sleeve. This ring abuts against the conical shoulder 10c when the sleeve is in its retracted position, and it abuts against the ridge formed by the O-ring 47 when the sleeve is in its extended position.

An on/off switch 51 is provided for de-energizing the instrument when the attenuator sleeve is in its fully retracted position. This switch includes a pair of contacts 52, 53 which are mounted on the insulative plug 16 by means of screws 54, 56 and nuts 57, 58. The contacts 52, 53 are biased outwardly, and when the attenuator sleeve is in its fully retracted position, they engage the insulative cap 38. When the sleeve is in any other position, they engage the conductive sleeve 37, as is best seen in FIG. 2. Electrical connections are made to the contacts by means of terminals 61, 62 which are mounted under the nuts 57, 58.

Means is provided for attaching the instrument to a workman's belt or to a test probe such as a Grip-all hot stick. This means includes a utility hook 63 pivotally mounted on a block 64 which is attached to the base portion of the housing 10 by suitable means such as screws 66. As illustrated in FIG. 1, the block 64 is enclosed within the insulative covering 11, and the hook 63 is mounted externally of the covering.

The sensing disk 13 is connected electrically to the input of an amplifier 71. In the preferred embodiment, this amplifier utilizes a field effect transistor and has a high input impedance. The output of the amplifier 71 is connected to an astable multivibrator 72 in such manner that when the electrostatic charge accumulation on the disk 13 reaches a predetermined level, the multivibrator is locked in one of its output states. The output of the multivibrator is applied to the output transducer 31 through an audio amplifier 73. In the preferred embodiment, the amplifiers 71 and 73 and the multivibrators 72 are constructed in the form of an integrated circuit which is mounted on the cup-shaped housing 19. Power is supplied to the amplifiers and multivibrators from the battery 26 through the switch 51.

Operation and use of the invention can be described briefly. When the attenuator assembly 36 is in its fully retracted position, there is no electrical connection between the contacts 52 and 53, and the instrument is de-energized. When the sleeve assembly is moved away from its fully retracted position, the conductive sleeve 37 completes the circuit between the contacts 52 and 53, energizing the unit. In the absence of an electrostatic field, the multivibrator 72 runs freely, and the output transducer 32 provides an intermittent audible tone or "beeping". In the presence of an electrostatic field, charge accumulates on the sensing element 13, and the multivibrator is locked in one of its states, converting the output of the transducer to a continuous warning tone. The attenuator sleeve 37 serves as an electrostatic shield for the sensing element 13 and provides means for adjusting the sensitivity of the instrument. With the sleeve in its fully retracted position, the sensing disk 13 is fully exposed, and the sensitivity of the instrument is maximum. The sensitivity decreases as the sleeve is moved toward its extended position.

The embodiment illustrated in FIG. 4 is generally similar to that illustrated in the remaining figures and described above except for the construction of the attenuator assembly. In this embodiment, the attenuator comprises an adjustable iris assembly 76 which is mounted on the outer end of the barrel portion of the housing 10. This assembly includes a plurality of movable leaves 77 which form an adjustable aperture 78 adjacent to the sensing element. The leaves serve as an electrostatic shield, and the sensitivity of the instrument is adjusted by varying the size of the aperture 78.

The invention has a number of important features and advantages. The attenuator provides means for continuously adjusting the sensitivity of the instrument. This permits reliable detection of potentials ranging from about 100 volts to 120 kilovolts. The on/off switch is arranged in such a manner that the instrument is in its most sensitive condition when it is first turned on. The intermittent or "bleeping" tone in the absence of an electrostatic field provides an indication that the instrument is operating properly. The unit is completely self-contained and is of a size that is readily carried. The instrument shown in FIG. 1, for example, has an overall length on the order of 9", a diameter on the order of 2", and it weighs approximately 1 lb.

It is apparent from the foregoing that a new and improved electrostatic potential detector has been provided. While only the presently preferred embodiments have been described, as will be apparent to those familiar with the art, certain changes and modifications can be made without departing from the scope of the invention as defined by the following claims.

I claim:

1. A self-contained portable device of a size readily held in the hand for detecting the presence of an electrostatic potential comprising: an axially extending tubular housing, an electrostatic sensing element mounted at one end of said housing, a power source disposed within said housing, alarm means carried by said housing, electrically energizable circuit means disposed within said housing for actuating said alarm means to indicate an alarm condition when said sensing element is exposed to an electrostatic field of predetermined strength, an axially elongated attenuator sleeve disposed coaxially of said housing and movable between extended and retracted positions relative to said sensing element, the sensitivity of the device increasing as said sleeve is moved toward its retracted position, and switch means operably connected to said sleeve for connecting said circuit means to said power source to energize said circuit means when said sleeve is moved away from its fully retracted position.

2. A device for detecting an electrostatic potential as in claim 1 wherein said sleeve includes an electrically insulative portion and an electrically conductive portion and said switch means includes a pair of electrical contacts which engage the insulative portion of the sleeve when said sleeve is in its fully retracted position and engage the conductive portion of the sleeve when said sleeve is in its other positions.

3. A device for detecting an electrostatic potential as in claim 1 wherein said circuit means includes an astable multivibrator which normally oscillates between first and second output states when energized, said multivibrator being connected to said alarm means in such manner that said alarm means is actuated when said multivibrator is in its first state, said sensing element being connected for holding said multivibrator in said first state when said element is exposed to an electrostatic field of said predetermined strength.

4. In a self-contained electrostatic potential detector of a size suitable to be held in the hand, an axially extending body member, an electrostatic sensing element carried by said body member, a power source carried by said body member, alarm means carried by said body member, circuit means energized by said power source connected to said alarm means and to said sensing element for actuating said alarm means to indicate an alarm condition when said sensing element is exposed to an electrostatic field of predetermined strength, adjustable attenuator means carried by said body member for attentuating the field to which said sensing element is exposed, and switch means operably connected to the attenuator means for controlling the energization of the circuit means according to the position of the attenuator means.

5. An electrostatic potential detector as in claim 4 wherein said attenuator means includes an attenuator sleeve disposed coaxially of said body member and movable between extended and retracted positions relative to said sensing element, said sleeve providing greater attenuation of the electrostatic field as it is moved toward its fully extended position.

* * * * *